United States Patent [19]

Little et al.

[11] Patent Number: 4,877,283
[45] Date of Patent: Oct. 31, 1989

[54] FLEXIBLE COVER AND SYSTEM FOR ENCLOSING AUTOMOBILE HATCH

[76] Inventors: Johnny L. Little; Vernetta Little, both of 4883 Pine Needle, Florissant, Mo. 63033

[21] Appl. No.: 250,348

[22] Filed: Sep. 28, 1988

[51] Int. Cl.⁴ .............................................. B60J 7/10
[52] U.S. Cl. .................................... 296/100; 296/76; 296/180.2; 296/102; 296/10
[58] Field of Search ............... 296/210, 102, 76, 136, 296/10, 100

[56] References Cited

U.S. PATENT DOCUMENTS

| | | | |
|---|---|---|---|
| 3,390,913 | 7/1968 | Hunter | 296/10 |
| 4,061,394 | 12/1977 | Vodin | 296/100 |
| 4,496,184 | 1/1985 | Byrd et al. | 296/100 |
| 4,566,728 | 1/1986 | Theodore | 296/76 |
| 4,799,726 | 1/1989 | Scott | 296/100 |

*Primary Examiner*—Robert R. Song
*Attorney, Agent, or Firm*—Senniger, Powers, Leavitt and Roedel

[57] ABSTRACT

A flexible cover system adapted for enclosing the rear hatch opening of an automobile having an immovable roof structure over the passenger compartment and a hatch frame rearward of the roof structure defining the hatch opening. The hatch opening provides communication between the passenger compartment and the environment outside the automobile. The flexible cover system comprises a flexible water-impermeable sheet dimensioned for covering the hatch. The sheet has a peripheral edge margin. Securements along at least portions of the peripheral edge margin of the sheet are adapted for securing the sheet tautly over the hatch opening and adjacent the hatch frame. The securements are releasable only upon access to a designated portion of the peripheral edge margin. A lock mechanism restricts access to said designated portion of the peripheral edge margin such that removal of the sheet from over the hatch is prevented when the mechanism is in a locked position and permitted when the mechanism is in an unlocked position. The securements and lock mechanism cooperate to prevent unauthorized removal of the sheet from over the hatch opening and unauthorized entry into the passenger compartment through the hatch opening in the absence of damage to the cover system or automobile.

16 Claims, 5 Drawing Sheets

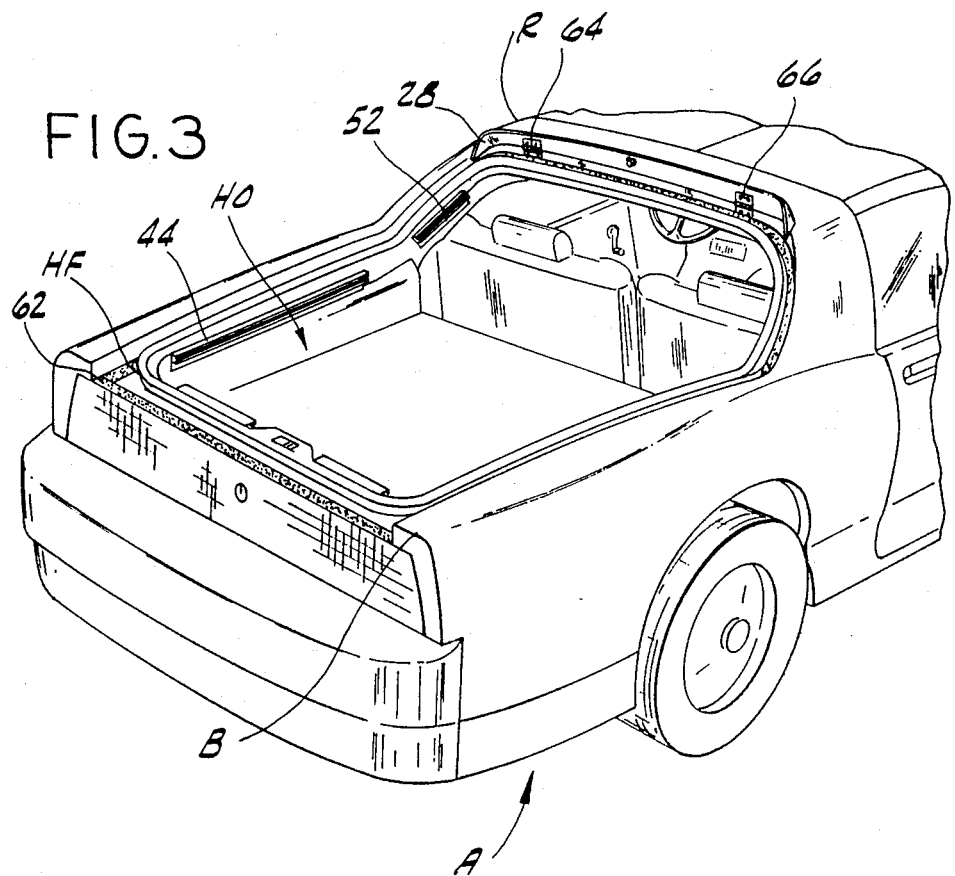

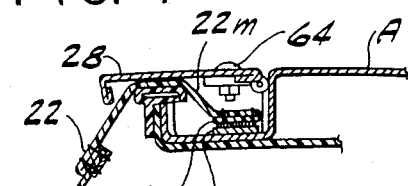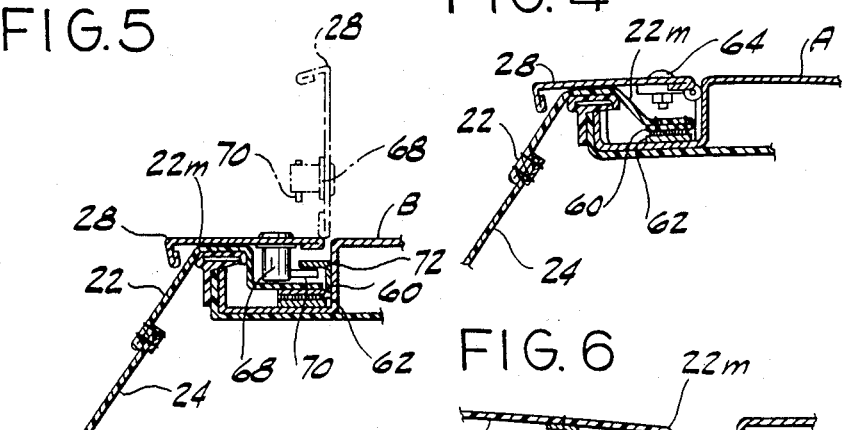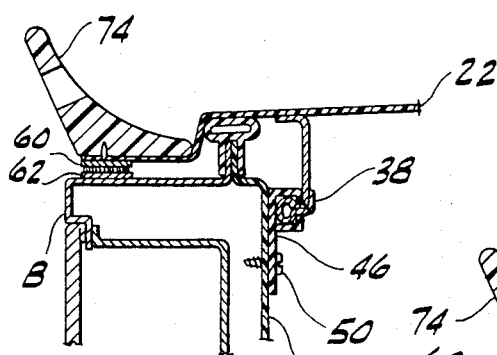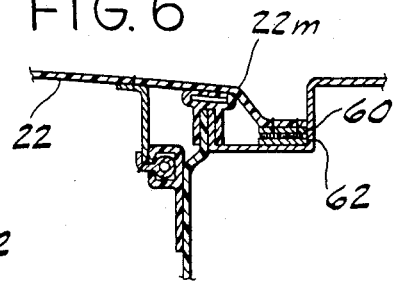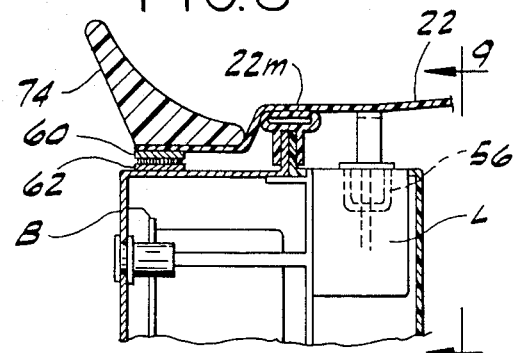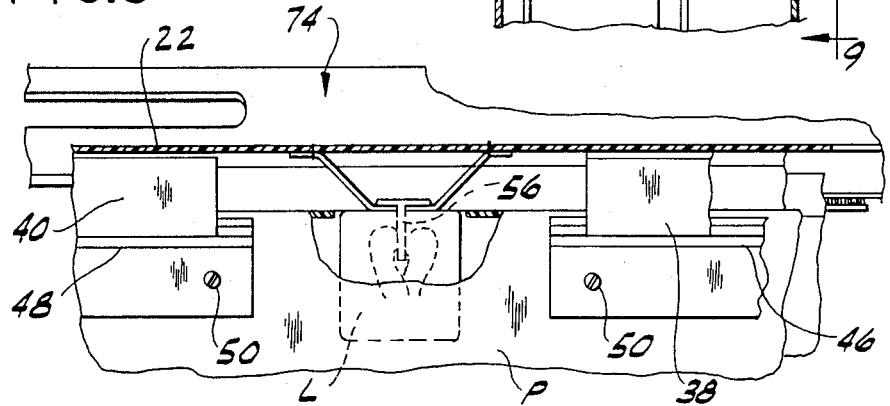

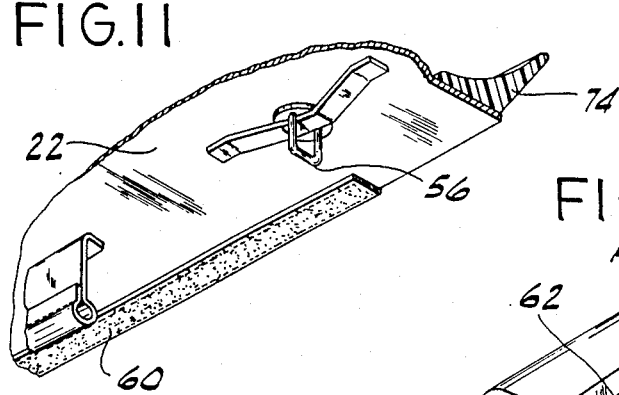
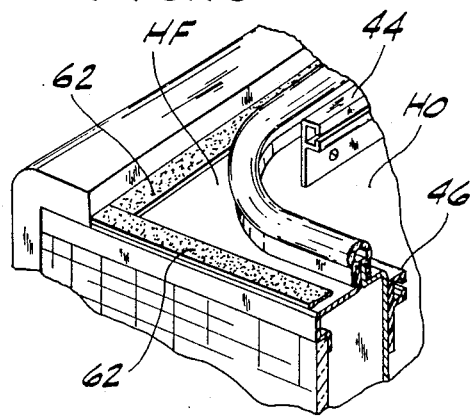
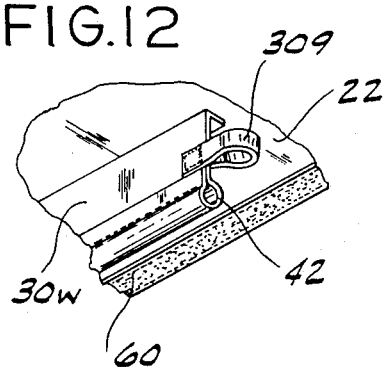
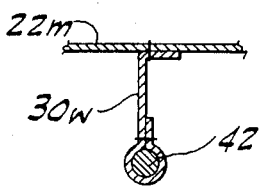
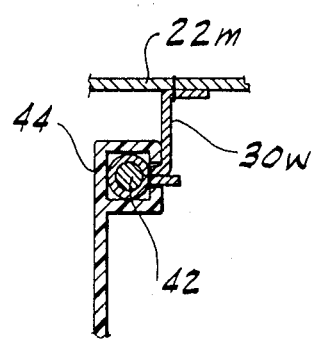
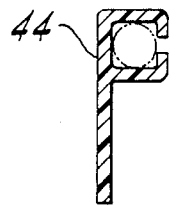

FLEXIBLE COVER AND SYSTEM FOR ENCLOSING AUTOMOBILE HATCH

BACKGROUND OF THE INVENTION

This invention relates generally to flexible covers for automobiles, and in particular to flexible covers for enclosing an automobile hatch.

For quite some time, automobile manufacturers have manufactured and sold automobiles having a variety of roof styles to consumers, such styles including standard hard top roofs, hard-top convertible roofs, soft-top convertible roofs, sun (or moon) roofs, and "T-tops". However, each style of roof has been perceived as having disadvantages. Standard hard top roofs offer maximum safety (in the event of an accident causing the auto to roll) and protection from the environment, but do not provide the "open" sensation provided by an automobile with its convertible roof removed. Hard-top convertibles are perceived by some as offering maximum safety and protection from the environment but being cumbersome and inconvenient when it is desired to remove or replace the convertible top. Soft-top convertibles are perceived by some as offering substantially more convenience than hard-top convertibles but being less safe and lacking in insulation from the environment, particularly during wintertime. Sun roofs and "T-tops" are perceived by some as being superior to soft-top convertibles with respect to safety and insulation from the cold, but inferior to convertibles with respect to that "open" sensation when the roof is removed. Many automobiles having sun roofs and "T-tops" also have hatch backs, i.e., rear hatch openings enclosed by rigid hatch doors. Although not adapted to be easily removed or reinstalled, an automobile's hatch door could be removed to increase the openness of the passenger compartment. However, as with a hard-top convertible, removal and replacement of the hatch door would be cumbersome and inconvenient.

SUMMARY OF THE INVENTION

It is among the objects of the present invention to provide a flexible cover system for enclosing the rear hatch opening of an automobile, and in particular for enclosing the rear hatch opening of an automobile that has a sun-roof or a T-top style roof. It is also an object of the present invention to provide such a flexible cover system adapted for being releasably secured over the hatch opening. It is also an object of the present invention to provide such a flexible cover system which prevents unauthorized removal of the flexible cover system from the automobile. It is further among the objects to provide such a cover system which is compact, lightweight and has a minimum of parts for easy storage and handling; and to provide such a cover system which is of relatively simple and inexpensive construction.

Generally, the flexible cover system of the present invention is adapted for enclosing the rear hatch opening of an automobile having an immovable roof structure over the passenger compartment and a hatch frame rearward of the roof structure defining the hatch opening. The hatch opening provides communication between the passenger compartment and the environment outside the automobile. The flexible cover system comprises a flexible water-impermeable sheet dimensioned for covering the hatch. The sheet has a peripheral edge margin. Securing means along at least portions of the peripheral edge margin of the sheet are adapted for securing the sheet tautly over the hatch opening and adjacent the hatch frame. The securing means release only upon access to a designated portion of the peripheral edge margin. Lockable access means restrict access to said designated portion of the peripheral edge margin such that removal of the sheet from over the hatch is prevented when the access means is in a locked position and permitted when the access means is in an unlocked position. The securing means and lockable access means cooperate to prevent unauthorized removal of the sheet from over the hatch opening and unauthorized entry into the passenger compartment through the hatch opening in the absence of damage to the cover system or automobile.

Thus, in the flexible cover system of the present invention, the sheet is adapted for enclosing the hatch opening of an automobile. The securing means provides for releasable securement of the sheet over the opening. Unauthorized removal of the sheet from over the hatch is prevented by the lockable access means. The flexible cover system of the present invention can be collapsed to a relatively compact and lightweight form that is easy to store and handle. Finally, the flexible cover system is of relatively simple and inexpensive construction.

These and other advantages will be in part apparent and in part pointed out hereinafter.

BRIEF DESCRIPTION OF THE DRAWINGS

FIG. 3 is a perspective view of an automobile showing a hatch opening from which the flexible sheet has been removed.

FIG. 4 is a cross-sectional view showing a hinged plate covering a designated portion of the peripheral edge margin of the flexible cover's sheet;

FIG. 5 is a cross-sectional view showing the hinged plate and a lock mechanism for locking the hinged plate over the designated portion of the peripheral edge margin;

FIG. 6 is a cross-sectional view showing a portion of the peripheral edge margin of the sheet secured over a side of the hatch opening;

FIG. 7 is a cross-sectional view showing a portion of the peripheral edge margin of the sheet secured over the rear of the hatch opening;

FIG. 8 is a cross-sectional view showing a portion of the peripheral edge margin cooperating with a locking mechanism;

FIG. 9 is a cross-sectional view taken along the line 9—9 of FIG. 8 showing the flexible cover secured to the inside rear of the automobile;

FIG. 10 is an enlarged partial perspective view showing "C" shaped channels fixed to the automobile and adjacent the hatch frame;

FIG. 11 is an enlarged partial perspective view of the flexible cover showing the rear underside of the peripheral edge margin;

FIG. 12 is an enlarged partial perspective view showing the underside of the peripheral edge margin;

FIG. 13 is a cross-sectional view showing a securing bead on the peripheral edge margin secured within a "C" shaped channel;

FIG. 14 is a cross-sectional view showing a securing bead on the peripheral edge margin;

FIG. 15 is a cross-sectional view showing a "C" shaped channel;

Corresponding reference numerals indicate corresponding parts throughout the several views of the drawings.

DETAILED DESCRIPTION OF THE PREFERRED EMBODIMENT

Figure 1:
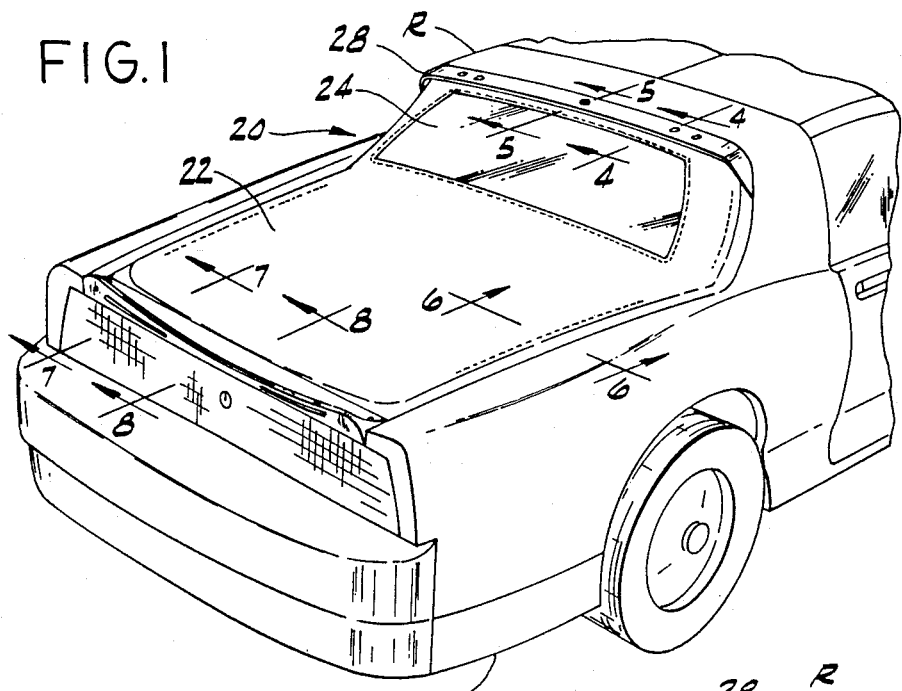
FIG. 1 is a perspective view of a flexible cover system constructed according to the principles of this invention attached to the rear hatch opening of an automobile.
Figure 2:
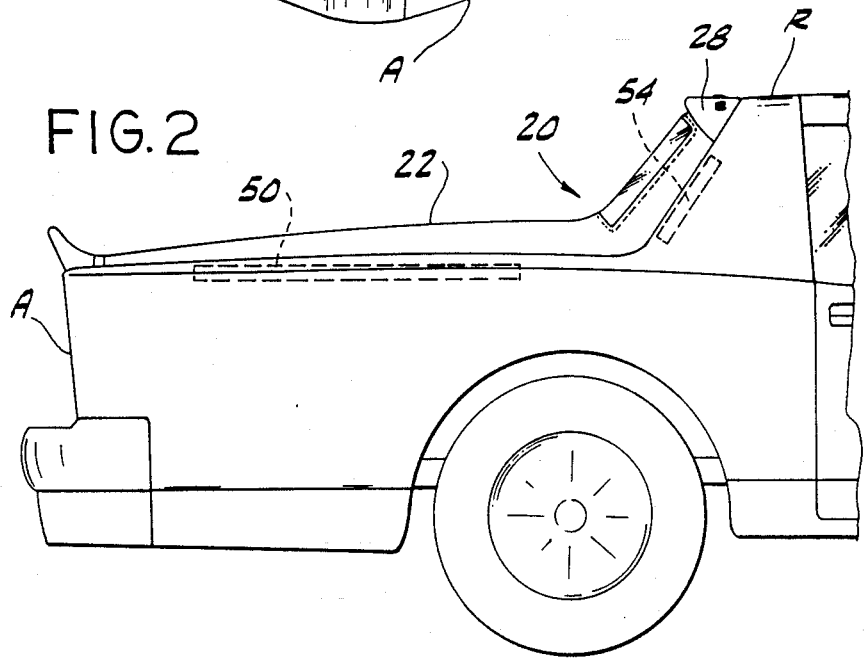
FIG. 2 is a side elevation view of the flexible cover system attached to the rear hatch opening of an automobile.
Figure 16:
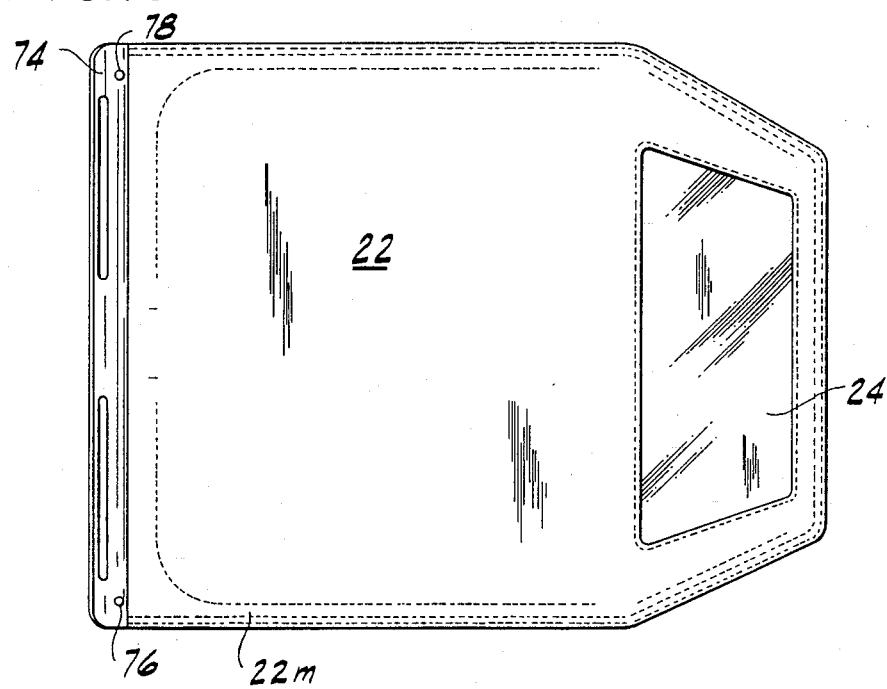
FIG. 16 is a top view of the flexible cover.

A flexible cover system constructed according to the principles of this invention, indicated generally as 20, is shown in FIGS. 1 and 2 enclosing the rear hatch opening of an automobile A. The automobile A has a passenger compartment, an immovable roof structure R over the passenger compartment, and a hatch opening HO (FIG. 3) rearward of the roof structure R. The hatch opening HO provides communication between the passenger compartment and the environment outside the automobile and is defined by a hatch frame HF in the body B of the automobile. An automobile of the type shown typically has a rigid hatch door (hatch back) which covers the hatch opening HO. Such rigid hatch door is removed from the automobile so that the automobile can accommodate the flexible cover system 20 of this invention.

Generally, the flexible cover system 20 comprises a flexible water-impermeable sheet 22 dimensioned for enclosing the hatch opening HO. Securing strips along portions of the peripheral edge margin 22m of the sheet 22 are slidably engaged by C-shaped channels fixed to the automobile A and adjacent to the sides and rear of the hatch frame HF. The securing strips and C-shaped channels releasably secure the sheet 22 tautly over the hatch opening HO and adjacent the hatch frame HF. As will be discussed in greater detail below, the securing strips can be released (or disengaged) from the C-shaped channels only upon access to the front portion of the peripheral edge margin 22m. A lockable access plate 28 restricts access to the front portion of the peripheral edge margin 22m. When the plate 28 is in a locked position, removal of the sheet 22 from over the hatch opening HO is prevented; when the plate 28 is in an unlocked position, removal of the sheet 22 from over the hatch opening HO is permitted. The securing strips and channels and the plate 28 cooperate to prevent unauthorized removal of the sheet 22 from over the hatch opening HO and to prevent unauthorized entry into the passenger compartment through the hatch opening HO in the absence of damage to the cover system 22 or automobile.

Figure 17:
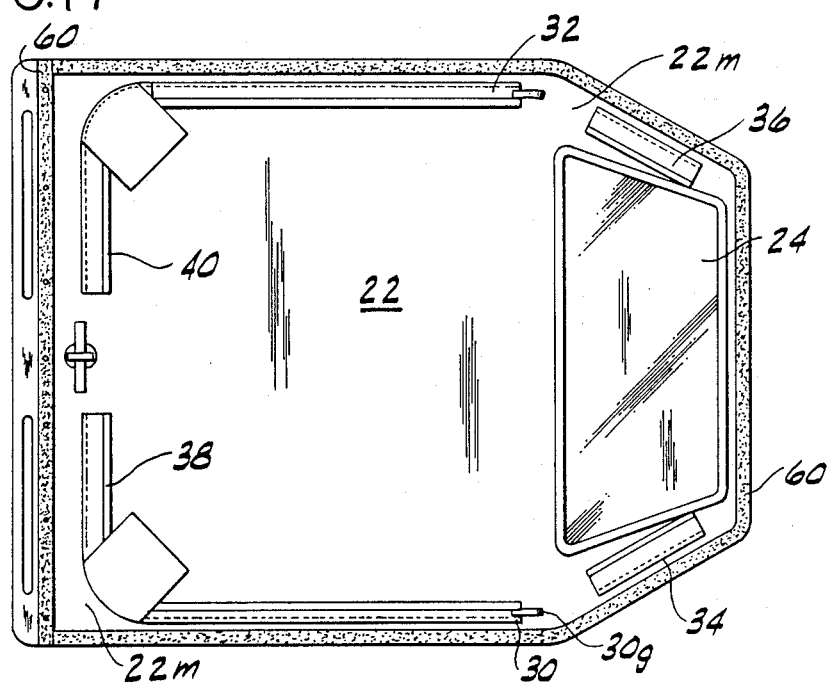
FIG. 17 is a bottom view of the flexible cover.

The sheet 22 includes a window 24 of flexible transparent film. The window 24 constitutes means for enabling a user within the passenger compartment to see through the sheet 22. As shown in FIG. 17, several securing strips extend from the underside of the sheet 22 on the peripheral edge margin 22m. Securing strips 30, 32, 34, and 36 secure the sides of the sheet 22 to the automobile A and securing strips 38 and 40 secure the rear of the sheet 22 to the automobile A. Securing strip 30 (FIGS. 12–14) comprises a web 30w stitched at one end to the edge margin 22m and looped and stitched at its other end to envelop a bendable plastic rope 42. The looped end of the web 30w and the plastic rope 42 form a bead which is adapted to mate with a complementary C-channel 44 fixed to the automobile and adjacent to the side of the hatch frame HF. A leading end of the bead is inserted into the channel 44 and then the securing strip 30 is pulled through the channel 44 until the sheet 22 is properly positioned over the hatch opening. A grasping loop 30g is stitched to the leading edge of the securing strip 30 to help a user pull the strip 30 through the channel 44. The securing strip 30 is constrained by the channel 44 from moving in a direction transverse of the channel 44 but not from sliding within the channel 44. Although only securing strip 30 is described in detail, it is to be understood that all of the other securing strips have similar constructions and mate with corresponding C-channels in similar ways.

The side securing strips 30, 32, 34, and 36 are each adapted to engage C-channels 44, 50, 52, 54, respectively, fixed to the automobile A and adjacent the hatch frame HF. The side strips and corresponding channels prevent the sheet 22 from moving sideways with respect to the automobile A.

FIGS. 7–9 show the releasable securement of the sheet 22 to the rear of the automobile. Rear C-shaped channels 46 and 48 are fixed to a rear panel P of the automobile A by screws 50 and adapted to slidably receive the rear securing strips 38 and 40, respectively. The channels 46 and 48 constrain the rear securing strips 38 and 40 from moving in a direction transverse of the channels 46 and 48 but not from sliding longitudinally within the channels 46 and 48. A Clevis 56 is connected to the peripheral edge margin 22m and between the rear securing strips 38 and 40 by a fabric loop 58. The Clevis 56 is dimensioned to be engaged by the locking mechanism L which is typically pre-existing in the automobile A for releasably locking the original rigid hatch door against the hatch frame HF. Thus, the central rear portion of the sheet 22 is releasably secured to the automobile A by the locking mechanism L.

Along the peripheral edge margin 22m is strips of VELCRO hook fasteners 60 which are adapted to releasably engage VELCRO loop fasteners 62 fixed to the hatch frame HF. The complementary VELCRO fasteners 60 and 62 hold the sheet 22 tautly over the hatch opening HO and also hold the edge of the sheet 22 flat against the hatch frame to provide a smooth and uniform appearance. The VELCRO loop fasteners 62 constitute quick connect means on the automobile and the VELCRO hook fasteners 60 constitute complementary quick connect means for connecting with the quick connect means on the automobile A.

The securing strips and their corresponding mating channels and the VELCRO strips constitute securing means for securing the sheet tautly over the hatch opening and adjacent the hatch frame. It is to be understood, however, that the sheet could be secured tautly over the hatch opening in a different manner without departing from this invention. For example, rather than the VELCRO strips and the securing strips, securing beads could be incorporated into the peripheral edge of the sheet and adapted to mate with corresponding channels fixed to the hatch frame. Thus, the sheet would be removably secured tautly over the hatch opening.

Reference is now made to FIGS. 4 and 5 which show the lockable access plate 28 adapted to restrict access to the front portion of the peripheral edge margin 22m. The solid lines represent the access plate 28 in a locked position fixed over the front portion of the peripheral edge margin 22m; the phantom lines represent the access plate 28 in an unlocked position and pivoted away from the front portion of the peripheral edge margin 22m. The front edge margin of the access plate 28 is pivotally connected to the automobile A by hinges 64 and 66 (FIG. 4). Preferably, such hinges are the same hinges that were used to secure the original hatch door to the automobile. If the same hinges are used, no new hinges need to be added to the automobile to incorporate the cover system 20 of this invention to the automobile. Additionally, if a user desires to remove the flexible sheet 22 and reinstall the original hatch door he need only disconnect the access plate 28 and reconnect the hatch door. Thus the flexible sheet 22 and original hatch door are interchangeable.

A lock mechanism 68 is fixed to the access plate 28 and includes an extensible tongue 70. The tongue 70 is extended or retracted by the insertion and turning of a key (not shown) in the lock mechanism 68. In the locked position, the tongue is extended to engage a rearward projecting lip 72 secured to the automobile. The lip 72 and tongue 70 prevent the access plate 28 from being pivoted up and away from the front portion of the peripheral edge margin 22M. Since the sheet is restrained by the channels on the sides and rear, it can only be removed (without damaging it) by access to the front portion of the peripheral edge margin. The front portion of the peripheral edge margin 22m constitutes a designated portion to which access is required for removal of the sheet. To remove the sheet, the access plate 28 is first pivoted upward and away from the peripheral edge margin, then the VELCRO hook strips 60 on the front portion of the peripheral edge margin are pulled away from the VELCRO loop strips 62 on the automobile, and then the sheet is slid rearwardly to disengage the securing strips from the channels. If the access plate 28 is not pivoted away from the front portion of the peripheral edge margin 22M, then the sheet 22 cannot be removed without tearing or otherwise damaging the cover system 20 or without damaging the automobile A. Thus, the securing strips/channel combination and lockable access plate 28 cooperate to prevent unauthorized removal of the sheet 22 from over the hatch opening HO and unauthorized entry into the passenger compartment through the hatch opening HO in the absence of damage to the cover system 20 or automobile A. To further secure the front portion of the peripheral edge margin 22m, the access plate 28 could be provided with downwardly projecting claws to grip the sheet when in the locked position.

A rear spoiler 74 is positioned on the rear portion of the peripheral edge margin 22m of the sheet 22. The spoiler 74 is secured to the body of the automobile A by screws 76 and 78 on both ends of the spoiler 74 with the rear portion of the peripheral edge margin 22m sandwiched between the spoiler 74 and body B. The primary purpose of the spoiler 74 is for aesthetics; however, it also helps hold the rear portion of the peripheral edge margin 22M against the body B of the automobile A. The cover system could be modified without departing from this invention. For example, the sheet could have securing strips along its side portions and front portions which are secured adjacent to the sides and front of the hatch frame and the lockable access means could be positioned along the rear portion of the sheet. In such a system, the lockable access means could be an elongate rigid member such as a rear spoiler with a downwardly protruding Clevis fixed to the spoiler and adapted to engage the existing rear lock mechanism of the automobile. Since the rear spoiler would be locked securely against the automobile with the rear portion of the peripheral edge margin sandwiched between, entry into the passenger compartment would be restricted.

OPERATION

In the attachment of the flexible cover system 20, shown and described in the preferred embodiment, to the automobile, the original rigid hatch door is removed from its hinges 64 and 66 and the lockable access plate 28 is connected to the hinges 64 and 66. The securing strips 38 and 40 extending from the rear portion of the peripheral edge margin 22m are slid into the channels 46 and 48. The Clevis 56 is inserted into the lock mechanism L. The front ends of securing strips 30 and 32 are inserted into the rear ends of channels 44 and 50, respectively, and slid forward within the channels. Securing strips 34 and 36 are inserted in channels 52 and 54. The sheet is pulled tautly and the VELCRO strips 60 on the peripheral edge margin 22m of the sheet 22 are mated with the complementary VELCRO strips 62 on the hatch frame HF. Once the sheet 22 is positioned over the hatch opening HO, the access plate 28 is pivoted downward against the sheet 22 and locked in place. In this position, access to the passenger compartment is restricted. Even if an intruder were to disengage VELCRO strips 60 from VELCRO strips 62, the securing strips within the channels would prevent further entry.

The sheet 22 can be removed from over the hatch opening 40 by: unlocking the access plate 28 and pivoting it upward and away from the sheet; pulling the VELCRO strips 60 and 62 apart; sliding the sheet rearward to disengage the side securing strips 30, 32, 34, and 36 from the corresponding channels 44, 50, 52 and 54; the Clevis 56 is released from the rear lock mechanism L; and the rear securing strips 38 and 40 are slid out of the rear channels 46 and 48. If a user desires to reinstall the rigid hatch door, he must remove the access plate 28 from the hinges 64 and 66 and reconnect the hatch door to the hinges 64 and 66.

When the flexible sheet 22 is removed from an automobile having a sun roof or "T-top", the automobile has an "open" feel similar to that of an automobile having a convertible roof. However, unlike a hard-top convertible, the flexible sheet 22 is not cumbersome and inconvenient; rather, it is compact and lightweight. It requires no additional loose parts or hardware that could be lost, and it can be collapsed to a relatively lightweight and compact form for easy transportability, storage, and handling.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A flexible cover system for enclosing the rear hatch opening of an automobile having a passenger compartment, an immovable roof structure over the passenger compartment and a hatch opening rearward of the immovable roof structure, the hatch opening providing communication between the passenger compartment and the environment outside the automobile and being defined by a hatch frame in the body of the automobile, the flexible cover system comprising:
- a flexible water-impermeable sheet dimensioned for covering the hatch opening, the sheet having a peripheral edge margin;
- securing means along at least portions of the peripheral edge margin of the sheet for securing the sheet tautly over the hatch opening and adjacent the hatch frame, the securing means being releasable only upon access to a designated portion of the peripheral edge margin; and
- lockable access means for restricting access to said designated portion of the peripheral edge margin such that removal of the sheet from over the hatch opening is prevented when the access means is in a locked position and permitted when the access means is in an unlocked position, the securing means and lockable access means cooperating to prevent unauthorized removal of the sheet from over the hatch opening and unauthorized entry into the passenger compartment through the hatch opening in the absence of damage to the cover system or automobile.

2. A flexible cover system as set forth in claim 1 further comprising:
- quick connect means on the automobile and adjacent to the hatch frame; and
- complementary quick connect means along the peripheral edge margin of the sheet for connecting with the quick connect means on the automobile.

3. A flexible cover system as set forth in claim 2 wherein the quick connect means on the automobile and the complementary quick connect means are VELCRO strips.

4. A flexible cover system as set forth in claim 1 wherein the securing means comprises slide fastener means.

5. A flexible cover system as set forth in claim 4 wherein the slide fastener means comprises:
- a hem along the peripheral edge margin of the sheet; and
- channel means on the automobile and adjacent to the hatch frame for slidably receiving the hem whereby the hem is free to slide longitudinally within the channel means but is constrained against movement in a direction perpendicular to the channel means.

6. A flexible cover system as set forth in claim 1 wherein the lockable access means comprises:
- a substantially rigid plate adapted to extend over said designated portion of the peripheral edge margin; and
- lock means for releasably locking the plate against the automobile, the plate being secured over said designated portion of the peripheral edge margin to resist access thereto when the lock means is in a locked position and the plate being released from securement to permit access to said designated portion of the peripheral edge margin when the lock means is in an unlocked position.

7. A flexible cover system as set forth in claim 6 further comprising hinging means for pivotally connecting the plate to the automobile such that the plate is positionable between a closed position in close proximity to said designated portion of the peripheral edge margin and an open position away from said designated portion of the peripheral edge margin.

8. A flexible cover system as set forth in claim 1 wherein the sheet further comprises window means for enabling a user within the passenger compartment to see through the sheet.

9. A flexible cover system as set forth in claim 8 wherein the window means comprises a flexible transparent film.

10. A flexible cover for enclosing the rear hatch opening of an automobile having a passenger compartment, an immovable roof structure over the passenger compartment, a hatch opening rearward of the immovable roof structure, and lockable access means for restricting access to a portion of the flexible cover, the hatch opening providing communication between the passenger compartment and the environment outside the automobile and being defined by a hatch frame in the body of the automobile, the flexible cover comprising:
- a flexible water-impermeable sheet dimensioned for covering the hatch, the sheet having a peripheral edge margin; and
- securing means along at least portions of the peripheral edge margin of the sheet for securing the sheet tautly over the hatch opening, the securing means adapted for releasably engaging complementary securing means fixed to the automobile and adjacent the hatch frame, the securing means being releasable only upon access to a designated portion of the peripheral edge margin, access to said designated portion of the peripheral edge margin being restricted by the lockable access means such that removal of the sheet from over the hatch is prevented when the access means is in a locked position and permitted when the access means is in an unlocked position, the securing means and lockable access means cooperable to prevent unauthorized removal of the sheet from over the hatch opening and unauthorized entry into the passenger compartment through the hatch opening in the absence of damage to the cover or automobile.

11. A flexible cover as set forth in claim 10 further comprising quick connect means on the peripheral edge margin of the sheet, the quick connect means being adapted for releasably connecting to complementary quick connect means on the automobile and adjacent to the hatch frame.

12. A flexible cover as set forth in claim 11 wherein the quick connect means is a VELCRO strip.

13. A flexible cover as set forth in claim 10 wherein the securing means comprises slide fastener means.

14. A flexible cover as set forth in claim 13 wherein the slide fastener means comprises a hem along the peripheral edge margin of the sheet adapted for engagement with channel means on the automobile and adjacent to the hatch frame, the channel means adapted for slidably receiving the hem whereby the hem is free to slide longitudinally within the channel means but is constrained against movement in a direction perpendicular to the channel means.

15. A flexible cover as set forth in claim 10 wherein the sheet further comprises window means for enabling a user within the passenger compartment to see through the sheet.

16. A flexible cover as set forth in claim 8 wherein the window means comprises a flexible transparent film.

* * * * *